United States Patent [19]

Wakefield

[11] Patent Number: 4,621,841
[45] Date of Patent: Nov. 11, 1986

[54] TUBULAR COUPLER WITH RETAINER

[75] Inventor: Douglas H. Wakefield, Stone, Great Britain

[73] Assignee: Corning Limited, Sunderland, England

[21] Appl. No.: 779,307

[22] Filed: Sep. 23, 1985

Related U.S. Application Data

[63] Continuation of Ser. No. 374,929, May 5, 1982.

[30] Foreign Application Priority Data

May 15, 1982 [GB] United Kingdom ............... 8114970

[51] Int. Cl.⁴ .................................... F16L 41/00
[52] U.S. Cl. .................................. 285/158; 285/356; 285/371; 285/911; 285/901
[58] Field of Search ............... 285/DIG. 12, 387, 371, 285/158, 161, 19, 20, 393, 356

[56] References Cited

U.S. PATENT DOCUMENTS

| Re. 22,713 | 1/1946 | Howe | 285/158 |
|---|---|---|---|
| 260,966 | 7/1882 | Frey | 285/393 X |
| 1,487,534 | 3/1924 | Bunten | 285/356 X |
| 1,855,447 | 4/1932 | Hagstedt | 285/158 X |
| 2,294,118 | 8/1942 | Leary | 285/356 X |
| 2,294,160 | 8/1942 | Crane et al. | 285/DIG. 12 X |
| 2,585,453 | 2/1952 | Gallagher et al. | 285/393 X |
| 3,055,683 | 9/1962 | Appleton | 285/158 |
| 3,178,206 | 4/1965 | Martin et al. | 285/DIG. 12 X |
| 3,428,337 | 2/1969 | Read | 285/387 X |
| 3,679,237 | 7/1972 | DeAngelis | 285/DIG. 12 X |
| 4,348,040 | 9/1982 | Harjar | 285/356 |
| 4,382,579 | 5/1983 | Morris | 251/214 |

FOREIGN PATENT DOCUMENTS

| 1189815 | 3/1965 | Fed. Rep. of Germany ...... 285/356 |
| 312633 | 3/1930 | United Kingdom . |
| 730813 | 6/1955 | United Kingdom . |
| 1071772 | 6/1967 | United Kingdom . |

Primary Examiner—Thomas F. Callaghan
Attorney, Agent, or Firm—Merchant, Gould, Smith, Edell, Welter & Schmidt

[57] ABSTRACT

A coupling between first and second tubular members comprising a flexible retaining ring fitted over the first tubular member below an annular enlargement thereof and entering into screw-threaded engagement with internal screw-threading on the second tubular member or a connector element attached thereto. The retaining ring is a split-ring member whose longitudinally extending slit enables it to be passed lengthwise over the first tubular member and is so dimensioned that on re-assuming its original form, the opposed margins of the slit abut and the retaining ring is held against the first tubular member against removal therefrom by the enlargement, and the second tubular member or connecting member is coupled to the first tubular member. A sealing member is positioned at the coupling to form a fluid-tight seal at the junction of the tubular members.

6 Claims, 7 Drawing Figures

TUBULAR COUPLER WITH RETAINER

This is a continuation of application Ser. No. 374,929, filed May 5, 1982.

This invention relates to the coupling together of two tubular members and, in particular, but not exclusively, the coupling together of two tubular members of which at least one is formed of glass.

It is usual in laboratory practice to connect together coaxial glass members which are brought together by providing ground coacting surfaces. Often, moreover, the coacting surfaces are made in conical form. Such connections are relatively costly to produce and are not resistant to build-up of fluid pressure, which may cause a loosening of the joint to relieve pressure, which the glass of the apparatus is capable of withstanding.

An alternative type of connection, which is of limited applicability and generally only used for closures is provided by moulded plastics members, which are formed externally with ribs and force-fitted into a glass neck. Incorrect tolerances or use of excessive force in achieving the force fit can often cause breakage of the neck, and such closures and the like are generally only used with inexpensive forms of vessel. Otherwise connection may be made by means of screw-threading formed on the two coaxial members. However, this is relatively expensive to produce and over-tightening will generally lead to fracture.

A further type of connection which it is often desired to achieve is through a butt joint between a pair of either glass pipes or pipes of other material such as stainless steel as in for example vacuum systems. One coupling for such purpose is described in British Patent Specification No. 730,813. This requires the pair of pipes to have adjacent end portions externally tapered away from each other and an elastic sealing gasket to be interposed between the end portions. The coupling which is suited to such an arrangement comprises a pair of metal rings surrounding the pipe end portions and each having an internal taper complementary to the external taper of the pipe end portion which it surrounds. The rings are slidable over and off the ends of the corresponding pipes. Because of stresses caused by the metal rings, bands of yielding material are interposed between them and the pipes, these bands being deformable under pressure to accommodate any out of roundness. The bands themselves are split to form opposed ends and hinged at an intermediate position so that the band can be opened or closed by swinging its ends about the hinge. The connection between the two pipe ends with their associated rings and yielding bands is achieved by means of a clamping element fitted around them all at the position of the butt joint, acting together to clamp the pipe end portions against the sealing gasket. Such an arrangement is complicated by the need to provide on the pipe end a non-standard formation to provide the tapering and seating for the sealing gasket. Moreover, the number of components for forming the seal is excessive in view particularly of the need for the provision of the yielding band in addition to the internally tapered rings. Further more, a limit is placed upon the locations at which the coupling can be formed by the fact that lateral access has to be provided to enable the clamping means to be fitted over the butt joint and secured thereto. This is not a problem where a single pipe coupling is being formed, but will be a problem with heat exchanger arrangements in which adjacent members of a stack of tubes passing through a pair of parallel header plates are to be coupled together at the level of the plates and where the access to tubes within the stack can only be endwise.

A further form of pipe coupling is disclosed in British Patent Specification No. 1,071,772. This pipe coupling is intended primarily for the coupling of metal pipes and requires them to have an externally flanged end portion. The screw-threaded sleeve engages both the flange of one of the pipe members and a complementary screw-threaded portion of a coupling member which is to hold the pipe members in end-to-end abutment. The sleeve is generally similar to a captive fitting, having an in-turned flange engageable with the flange of the first of the pipe members. A portion of the wall of the sleeve adjacent the in-turned flange is cut away to enable the sleeve to be fitted over and removed from the flanged end of the pipe by movement laterally thereof. In general the sleeve is of C-section and is slipped laterally onto its associated pipe and then moved axially forward towards the coupling position. Such an arrangement is likewise unsuitable for use in forming connections between internal pipes or tubes of stacks of heat exchangers because of the problem of access and moreover in being designed specifically for metal pipe couplings makes no provision of ensuring that stressing effects at the coupling position are avoided.

It is an object of the invention to provide a coupling system capable of general application wherever two coaxial members need to be coupled together. It is a further object of the invention to provide a coupling arrangement which can be employed when only longitudinal access to pipe ends is available to provide nevertheless a coupling which will remain gas-tight under both pressure and vacuum conditions.

According to the present invention, there is provided a coupling between two coaxial members at mouth regions thereof, one of which tubular members undergoes an increase in diameter at a position at or adjacent to said mouth region thereof, the coupling comprising an annular retaining member disposed around, separated from the mouth thereof by such increased diameter portion and formed separately from said one tubular member, the annular retaining member being an externally screw-threaded split-ring member formed with a longitudinal slit extending therethrough along the entire length thereof providing abutting longitudinally extending faces at the slit and being sufficiently flexible to permit its expansion to define an opening larger in cross-section than said increased diameter portion of said one tubular member, the retaining member being retained on said one tubular member against withdrawal by rotation and/or displacement lengthwise of said one tubular member at said position thereof while retaining said faces thereof in abutment, as a result of its being in screw-threaded engagement with the other of said tubular members or with a connector element attached to the other of said tubular members, which coupling additionally comprises a resilient sealing element positioned therein to form a fluid-tight seal at the junction of said tubular members.

The tubular member over which the annular retaining means is fitted will usually be formed of glass, especially borosilicate glass, although it may be formed, for example, of metal. The other tubular member may also be formed of glass, although, as will be apparent hereinafter, it may often be formed of thermoplastics material, which should obviously not be attacked by a fluid which it comes into contact with. A preferred such plastics material is polypropylene. The annular retaining member may likewise be formed of polypropylene.

The annular retaining member can be used for forming a variety of types of connection to be described hereinafter. A common characteristic of the connections is the need for one of the tubular members to possess a circumferential portion of increased diameter for holding the retaining member against lengthwise displacement. This circumferential enlargement may be merely a beading, or shallow flange (such as may be formed readily at the mouth of the tubular member). This beading can be formed in the laboratory or workshop, in the case of glass tubing, or, as in the case of glass vessels such as flasks, during manufacture thereof.

The annular retaining member is constructed as a split-ring flexible member, so that it can be expanded for drawing over the increased diameter portion of the first tubular member. Such a split-ring member may be particularly conveniently disposed around the tubular member if, in addition to having a full longitudinal slit, it is additionally formed with one or more further slits extending along part of the length thereof, so as to provide one or more hinge areas which enhance the ability of the split-ring member to be opened out. The split-ring member is additionally preferably formed with a circumferential flange at its forward end in the sense of its direction of fitting onto the tubular member. This flange serves as convenient abutment means for the other tubular member or connector element attached to it to prevent the retaining member from being completely withdrawn into it. The flange may be provided with one or more straight-edged peripheral regions to assist in handling of the retaining member, while rotating the other tubular member or connector attached to it when first coupling together the tubular members, or when desiring to separate them. At other times, the other tubular member (or its connector) and the retaining member will remain connected together through their mutual screw-threading, with the beading, or the like, on the first tubular member ensuring that the coupling cannot be pulled apart. It is essential for this purpose that the split-ring member must close to a complete annulus in engaging the tubular member around which it is fitted. Otherwise, under working conditions the sealing element will tend to be drawn into the gap in the retaining member and the requisite seal will be lost.

Moreover, the split-ring member must not be merely resilient, it must be flexible and hence is generally formed of plastics material. Whilst thin metal is resilient and capable of expanding around beading on the mouth of a length of glass tube, it cannot be used because on springing back and/or when subject to stress there is a significant risk of glass breakage.

Because of its flexible nature, the split-ring member can be opened out sufficiently to enable it to be slid over beading or the like provided on the end of its associated tubular member to close again to form a complete annulus once it has passed the beading. This is of considerable importance as will be appreciated hereinafter from the construction shown in the drawings, when couplings are formed between end-to-end abutting tubular elements in connecting tubes present in stacks in tube heat exchangers either to adjacent tubes or to inlet or outlet tubes, especially when such tubes of the stack are located within the stack so that lateral access to the circumference of the tubes is not possible.

Fluid tightness at the connection between the tubular members is provided by means of a compressible, usually rubber, sealing element between the tubular members. This will undergo compression to provide the seal, as the aforementioned screw-threaded engagement is completed. When the seal is to be in contact with an aggressive fluid, the rubber sealing element may be covered with an inert sheath, for example formed of polytetrafluoethylene.

For a better understanding of the invention and to show how the same can be carried into effect, reference will now be made, by way of example only, to the accompanying drawings, wherein.

Figure 1:
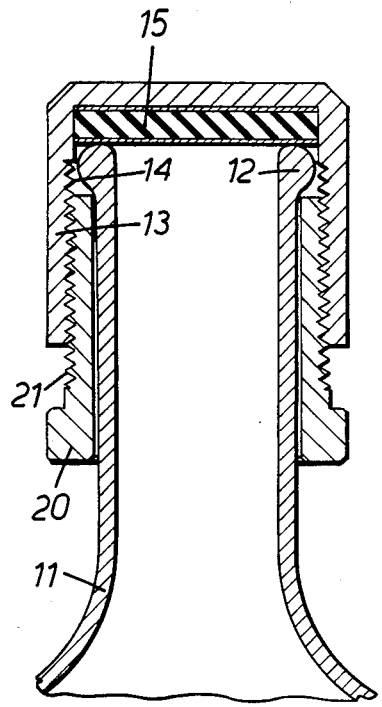
FIG. 1 is a longitudinal section through the neck of a glass container having a closure embodying this invention.
Figure 2:
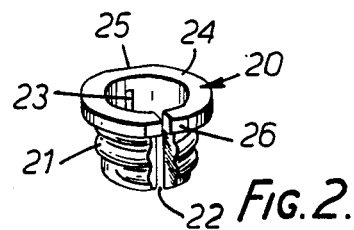
FIG. 2 is a perspective view through the split-ring member of the connection shown in FIG. 1.

Referring to the drawings, FIG. 1 shows a neck 11 which may belong to a glass flask, or bottle. Instead of, as hitherto, being ground in the mouth region thereof, to take a ground glass stopper or being closed by means of a force-fitted plastic stopper, use is made of a beading 12 at the mouth of the stopper to retain on the neck 11 a polypropylene split-ring retaining member 20, which externally screw-threaded at 21. The split-ring member 20 can be seen more clearly from FIG. 2 to have a slot 22 extending completely lengthwise thereof and a diametrically opposed slot 23 extending part of the length thereof. At one end, the split-ring retaining member 20 is formed with a flange 24 having oppositely disposed flat marginal regions 25 and 26. The screw-threading at 21 is engaged by internal screw-threading 14 on a moulded polypropylene cap 13 with interposition of a polytetrafluoethylene (PTFE) coated rubber disc 15.

In assembling the connection, the split-ring retaining member 20 is first of all opened out to allow it to be passed over the beading 12 at the mouth of the neck 11 and is allowed to close once the beading has been cleared. The cap 13 with disc 5 therein is then brought to the neck and simply brought into engagement with screw-threading on the retaining member 21. The cap B serves to keep the retaining member 20 closed and hence it, and thus the cap, are retained on the neck as a closure against any attempt to pull the cap off the neck. This is because the beading 12 interferes with any tendency for the retaining member to undergo linear displacement in the mouthward direction. The continued turning of the cap 13, as it is fitted on the retaining member 20 causes compression of the rubber disc and hence provision of a fluid-tight seal.

The split-ring retaining member 20 is utilised in forming the closures shown in each of FIGS. 3 to 7.

Figure 3:
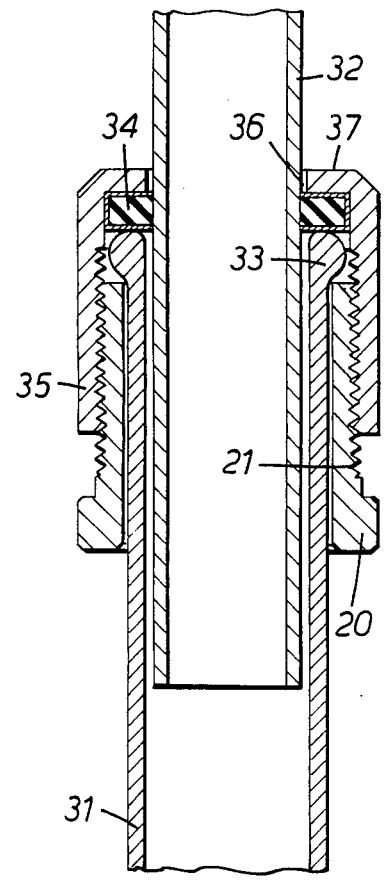
FIG. 3 is a longitudinal section through a telescopic joint between two tubes, embodying this invention.

Thus, in FIG. 3 a telescopic joint is formed between an outer glass tube 31 and an inner tube 32, which is to provide an extension thereof. The outer tube 31 has a beaded end 33 over which is fitted a split-ring retaining member 20 in the manner described with reference to FIG. 1. A PTFE sheathed rubber washer 34, which grips the exterior surface of the tube 32 a short distance from the end thereof which enters the tube 32, is seated in internally-threaded moulded polypropylene cap 35 having an opening 36 centrally disposed in the end face 37 thereof. The cap 35 has been slipped over the tube 33 either before provision of the washer 34 or from the opposite end of the tube 32 to that shown. By effecting screw-threaded engagement between the cap 35 and the retaining member in the manner described with reference to FIG. 1, as a result of the cap's abutting against the tightly fitted washer 34 and constraining the retaining member from undergoing lengthwise displacement, the tubes 31 and 32 are held in sealing engagement with each other.

Figure 4:
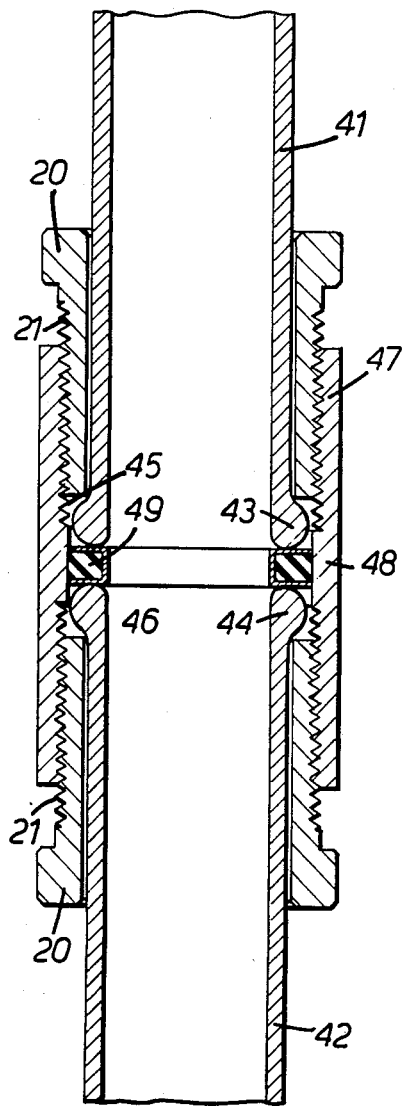
FIG. 4 is a longitudinal section through a butt joint between two tubes, embodying this invention.

FIG. 4 shows a butt joint between two opposed glass tubes 41 and 42. These are formed at their mouths with beading 43 and 44 respectively by means of which split-ring retaining members 20 kept on the tubes in the manner described with reference to FIG. 1. The screw-threading 21 on the retaining members 20 is engaged by internal screw-threading at 45 and 46 on a moulded cylindrical polypropylene connector 47, which is open at both ends. Screw-threading 45 engages screw-threading 21 on the retaining member 20 of tube 42. The connector 47 has an internally smooth central section 48 which contacts the external surface of a PTFE sheathed rubber washer 49 placed between the tubes 41 and 42 prior to bringing them together by means of the connector 47 and serving to ensure that a fluid-tight seal is provided at the connection thus formed. Because of the presence of beadings 43 and 44, the connection is secure against pull in the direction of either of the tubes 41 and 42 as the connector 47 engaged with the retaining members 20 prevents the retaining members from opening out and passing over the respective beading.

Figure 5:
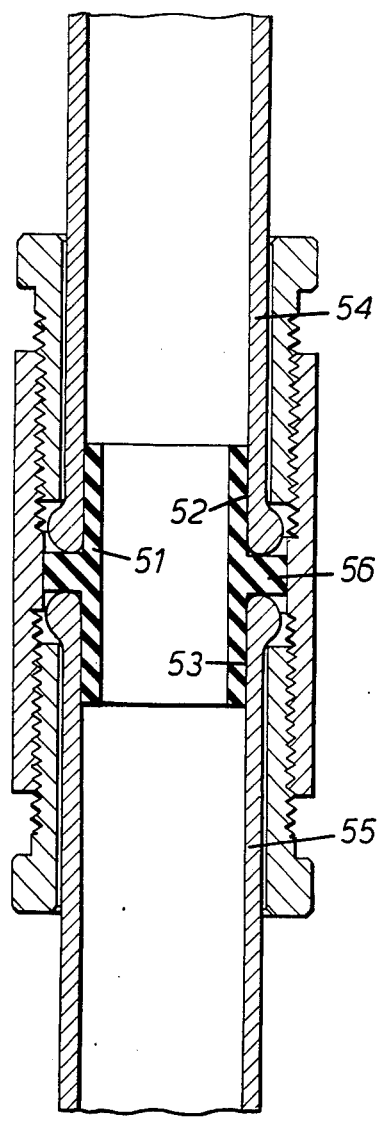
FIG. 5 shows a variant of the butt joint of FIG. 4.

FIG. 5 shows a variant of the connection of FIG. 4 intended for use when relatively high pressures of, say, 7 kPa obtain in the fluid flow system of which glass tubes 41 and 42 form a part. Here, the rubber washer 49 is replaced by a PTFE sheathed moulded rubber sleeve 51, which has cylindrical surfaces 52 and 53, which are in sealing contact with the internal surfaces 54 and 55 of glass tubes 41 and 42, respectively. A central external annular flange 56 of the sleeve is positioned between the beadings 43 and 44.

Figure 6:
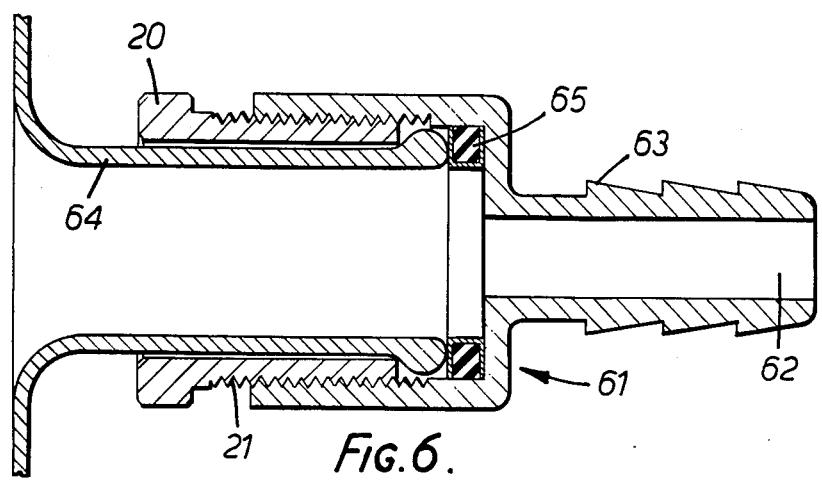
FIG. 6 is a longitudinal section through a glass vessel neck having a hose connector fitted thereto by means of a connection embodying this invention.

Referring next to FIG. 6, a moulded polypropylene hose coupling 61 having a central passageway 62 and external annular ribbing 63 to be engaged by a rubber or plastics hose is fitted to a glass vessel neck 64 with interposition of an externally screw-threaded retaining member 20 and a rubber washer 65. The neck 64 may belong to a Liebig condenser. The fitting of the hose coupling 61 on the neck 64 will be carried out in an analogous manner to the fitting of the cap 13 on the vessel neck 11 shown in FIG. 1. A particular advantage of connecting a hose to a vessel neck in the manner shown in FIG. 6 is that the sometimes difficult task of stretching the hose to fit over beading on the fragile neck of a glass vessel is avoided. This operation is particularly difficult to carry out when the glass vessel is already incorporated into glass apparatus held on clamps or frames in positions at which access for the awkward fitting of the hose is difficult. The hose can now be fitted over the annular ribbing 63 of the coupling 61 at a convenient location and then connected to the glass neck simply by screw-threaded engagement between the coupling 61 and the retaining member 20.

Figure 7:
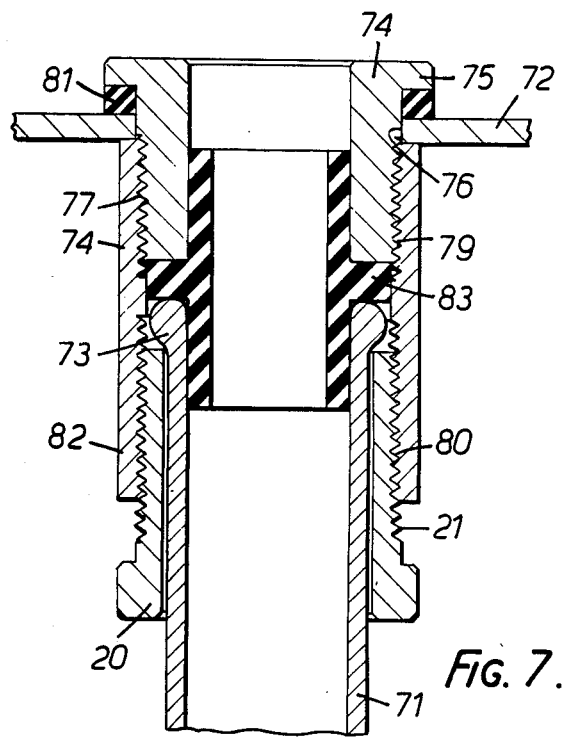
FIG. 7 shows in longitudinal section the connection of a glass tube to a bulkhead plate by means of a connection embodying this invention.

Finally, FIG. 7 shows the use of a retaining member 20 in connecting a glass tube 71 to a bulkhead 72, as may be employed in a heat exchanger construction, where the glass tube 71 will be one of a number of like tubes to be positioned within the heat exchanger between entry and exit bulkhead positions. Each glass tube 71 is formed at its mouth with a beading 73 over which is passed an opened retaining member 20 to grip the tube on closure of the slot 22 therein. A moulded polypropylene sleeve 74 having an annular flange 75 projects through an opening 76 in the bulkhead, the sleeve 74 being externally threaded at 77. A connector 78 similar in form to the connector 47 shown in FIG. 4 enters into engagement through internal screw-threading at one end 79 with the external screw-threading at 77 on the sleeve 74 and through internal screw-threading at the other end 80 with the screw-threading 21 on the retaining member 20 fitted on the glass tube 71 and serves thus to couple the glass tube 71 to the sleeve 74 and thus hold it on the bulkhead. A rubber washer 81 disposed between flange 75 of the sleeve 74 and the bulkhead 72 and a rubber sleeve 82 having the same shape as sleeve 51 shown in FIG. 5, disposed within the sleeve 74 and the glass tube 71 with an annular flange 83 disposed therebetween, ensure that a fluid-tight seal is achieved at the coupling of the glass tube to bulkhead 72 as a result of compression of the washer 81 and flange 83, which takes place respectively on completion of engagement between screw-threading 77 on the sleeve 74 and screw-threading 79 of the connector 78 and completion of engagement between screw-threading 21 in the retaining member 20 and screw-threading 80 of the connector.

I claim:

1. A coupling formed between two rigid and undeformable coaxial tubular members, one of which tubular members is rigid, undeformable, has a smooth outer surface undergoes an increase in external diameter at a mouth region thereof in the form of a rounded circumferential flange at which it is to be coupled to the other tubular member and is of substantially uniform internal diameter in said mouth region, the coupling comprising a single annular retaining member disposed around said one tubular member along a portion of the length thereof and being formed separately from said one tubular member, the annular retaining member being a one-piece split-ring member of synthetic plastic material having a cylindrical inner surface and having straight cylindrical external threads, said retaining member being formed with a slit extending therethrough along the entire length thereof in a direction parallel to its cylinder axis providing abutting longitudinally extending faces at the slit and being sufficiently elastically deformable to permit its expansion to define an opening sufficiently larger in cross-section than said increased diameter portion of said one tubular member for the retaining member to be fitted around said portion of the length of said one tubular member, the external diameter of said portion of the length of said one tubular member and the internal diameter of said retaining member being matched so that, in the coupling with the retaining member emplaced on said portion of the length of said one tubular member, said faces are in abutment along their entire length creating a continuous ring of said synthetic plastic material in intimate contact with the exterior of said portion of the length of said one tubular member to apply equal pressure around the one tubular member throughout the area of contact, with the internal diameter of said retaining member being smaller than the maximum external diameter of said one tubular member at said mouth region thereof, the retaining member being retained on said one tubular member against withdrawal lengthwise from said one tubular member at said mouth region thereof while retaining said faces thereof in abutment, as a result of the retaining member being in operative screw-threaded engagement with the other of said tubular members and in engagement with said rounded circumferential flange, which coupling additionally comprises a resilient sealing element positioned forwardly of and adjacent to said mouth region, means fixing said sealing element to said other tubular member to provide fluid-tight seal between said tubular members.

2. A coupling according to claim 1 wherein said one tubular member is formed of glass.

3. A coupling according to claim 1 wherein said annular retaining member is formed of polypropylene.

4. A coupling according to claim 1 wherein the split-ring member is formed with at least one further longitudinal slit extending therethrough along part of the length thereof from one end thereof.

5. A coupling according to claim 32 including a bulkhead and wherein said other of which tubular members extends through an opening in the bulkhead and has a circumferentially flanged portion whereby it is retained within the bulkhead and an externally screw-threaded portion projecting out of the bulkhead to terminate in a free end opposite said mouth region.

6. A coupling according to claim 1 wherein said sealing element is formed with an annular rib around the external surface thereof against which abut said mouth region of said one tubular member and the free end of the other tubular member.

* * * * *